United States Patent
Shih et al.

(10) Patent No.: US 7,958,344 B2
(45) Date of Patent: *Jun. 7, 2011

(54) METHOD FOR ADJUSTING SET-UP DEFAULT VALUE OF BIOS AND MAINBOARD USING THE SAME METHOD

(75) Inventors: Wen-Hsin Shih, Taipei (TW); Chin-Fong Pan, Taipei (TW)

(73) Assignee: Inventec Corporation, Taipei (TW)

( * ) Notice: Subject to any disclaimer, the term of this patent is extended or adjusted under 35 U.S.C. 154(b) by 939 days.

This patent is subject to a terminal disclaimer.

(21) Appl. No.: 11/852,512

(22) Filed: Sep. 10, 2007

(65) Prior Publication Data

US 2008/0288769 A1 Nov. 20, 2008

(30) Foreign Application Priority Data

May 16, 2007 (TW) ................................ 96117435 A

(51) Int. Cl.
*G06F 15/177* (2006.01)
*G06F 9/00* (2006.01)
*G06F 1/24* (2006.01)

(52) U.S. Cl. .................................. 713/100; 713/1; 713/2
(58) Field of Classification Search .................. 713/1, 2, 713/100
See application file for complete search history.

(56) References Cited

U.S. PATENT DOCUMENTS

| | | | |
|---|---|---|---|
| 6,367,007 B1 * | 4/2002 | Do | 713/2 |
| 6,718,464 B2 * | 4/2004 | Cromer et al. | 713/2 |
| 7,013,385 B2 * | 3/2006 | Abbondanzio et al. | 713/2 |
| 7,103,641 B2 * | 9/2006 | Brannock | 709/217 |
| 7,577,829 B2 * | 8/2009 | Dennis | 713/1 |
| 2006/0020844 A1 * | 1/2006 | Gibbons et al. | 714/2 |

* cited by examiner

*Primary Examiner* — Ji H Bae
(74) *Attorney, Agent, or Firm* — J.C. Patents

(57) ABSTRACT

A method for adjusting a set-up default value of a BIOS and a mainboard using the method are provided. The adjusting method used by the mainboard includes providing an original set-up default value and an adjusting table. The original set-up default value is adjusted according to the adjusting table, so as to obtain a customized set-up value, and to store the set-up value in a set-up value memory.

7 Claims, 3 Drawing Sheets

METHOD FOR ADJUSTING SET-UP DEFAULT VALUE OF BIOS AND MAINBOARD USING THE SAME METHOD

CROSS-REFERENCE TO RELATED APPLICATION

This application claims the priority benefit of Taiwan application serial no. 96117435, filed May 16, 2007. All disclosure of the Taiwan application is incorporated herein by reference.

BACKGROUND OF THE INVENTION

1. Field of the Invention

The present invention relates to a computer. More particularly, the present invention relates to a method for adjusting a set-up default value of a basic input output system (BIOS) of a computer and a mainboard using the method.

2. Description of Related Art

In each computer system, a mainboard has its own BIOS. When the computer is booted, a central processing unit (CPU) loads in the BIOS and related set-up value, and then executes a boot procedure according to the set-up value. If the user intends to modify the BIOS set-up value, for example the user hopes that the priority sequence of booting is hard disk, optical disk drive, network device, or hopes that the priority sequence of booting is optical disk drive, hard disk, and universal serial bus (USB) device, it is necessary for the user to enter into the BIOS to modify the set-up value.

Usually, the BIOS set-up value is stored in a CMOS memory. If the set-up value is not stored in the CMOS memory, or the set-up value stored in the CMOS memory is invalid, by the execution of the CPU, the BIOS writes a set-up default value record in the BIOS memory into the CMOS memory, so as to be used as the BIOS set-up value. However, each customer giving commission to manufacture the computer system may put forward different requirements on the set-up default value, it is necessary for the computer system manufacturer to modify the set-up default value in the BIOS memory according to the requirements of different customers. Therefore, it is necessary for the computer system manufacturer to prepare a plurality of BIOS firmware code versions to satisfy the requirements of different customers. Therefore, a problem of managing a great number of BIOS firmware code versions is generated. In the other aspect, each BIOS firmware code version must be assured that the BIOS operates normally through a verifying procedure. However, for a great number of BIOS firmware code versions generated to satisfy the requirements of different customers, it is necessary to cost a great amount of time, equipment, and labor force cost to verify each BIOS firmware code version, which also increases the product development time course.

In another conventional art, all the set-up default values required by all the customers are prewritten in a same BIOS firmware code version, so it is only necessary to verify the single version, thereby saving the product development time course. However, for the conventional art, a larger memory space is required to store the BIOS firmware code, thereby increasing the manufacturing cost of the product. Further, if requirements of a new customer exist, another version of the BIOS firmware code is added to satisfy the requirements of the new customer. The continuous progression and releasing of the version serial number may cause problems for the old customers. The reason is that the content of the BIOS is not changed, and only the default value of the new customer is added.

SUMMARY OF THE INVENTION

Accordingly, the present invention is directed to provide a method for adjusting a set-up default value of a BIOS, which is capable of adjusting the set-up default value according to the requirements of different customers under a single BIOS version.

The present invention is further directed to provide a computer readable storage medium capable of storing a computer program. The computer program is used to be loaded into a computer system and to make the computer system execute the method for adjusting the set-up default value of the BIOS.

The present invention is further directed to provide a mainboard capable of executing the method for adjusting the set-up default value of the BIOS.

As embodied and broadly described herein, the present invention provides a method for adjusting a set-up default value of a BIOS. The adjusting method includes providing an original set-up default value and an adjusting table; adjusting the original set-up default value according to the adjusting table to obtain a customized set-up default value; and storing the customized set-up default value in a set-up value memory.

In an embodiment of the present invention, the adjusting table includes a flag field, an overwrite value field, and an overwrite address field. The flag field is used to indicate whether to overwrite a part of the content of the original value. The overwrite value field is used to record an overwrite value. The overwrite address field is used to record the address to be overwritten in the set-up value memory. In an embodiment of the present invention, the step of adjusting the original set-up default value according to the adjusting table of the adjusting method includes: if the adjusting table has at least one overwrite value, reading the overwrite value, a corresponding address, and a corresponding mask from the adjusting table. According to the address, the original set-up default value is read from the BIOS or the set-up value memory. According to the mask, the original set-up default value and the mask are rotated rightward for i bits, in which i is an integer greater than or equal to 0. An AND operation is performed on the rotated original set-up default value and mask to obtain a first median. An OR operation is performed on the first median and the overwrite value to obtain a second median. The second median is rotated leftward for i bits, so as to be used as the customized set-up default value. According to the address, the customized set-up default value is stored back to the set-up value memory.

In an embodiment of the present invention, the computer readable storage medium is a BIOS memory used to store a BIOS program, so as to make the computer execute the BIOS program and the adjusting method.

In an embodiment of the present invention, the mainboard includes a BIOS memory for storing the BIOS, a set-up value memory for storing a group of set-up values, and a CPU for executing a plurality of instructions of the BIOS. The instructions include copying the original set-up default value from the BIOS to the set-up value memory, so as to be used as an initial value of the group of set-up values; reading the original set-up default value from the set-up value memory; and executing each step of the adjusting method.

The present invention adopts a structure of the BIOS with a built-in adjusting table. Therefore, when it intends to modify the requirement of the customer, so long as the overwrite value is adjusted within the adjusting table, the requirement is modified when the computer loads the BIOS. Therefore, so long as a version of BIOS is written, and the method of the present invention is added, it is not necessary to cost a great amount of labor force and resource to maintain the version of the BIOS to achieve the requirement of the customer.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following, embodiments of a method for adjusting a set-up default value of a BIOS are provided according to the present invention. Those of ordinary skill in the art can realize the following embodiments in the form of a computer program (e.g., firmware code), and can use a computer readable storage medium (e.g., EEPROM and FLASH memory etc.) to store the computer program for the computer to execute it, such that the method for adjusting the set-up default value of the BIOS is realized by electronic automation.

Figure 1:
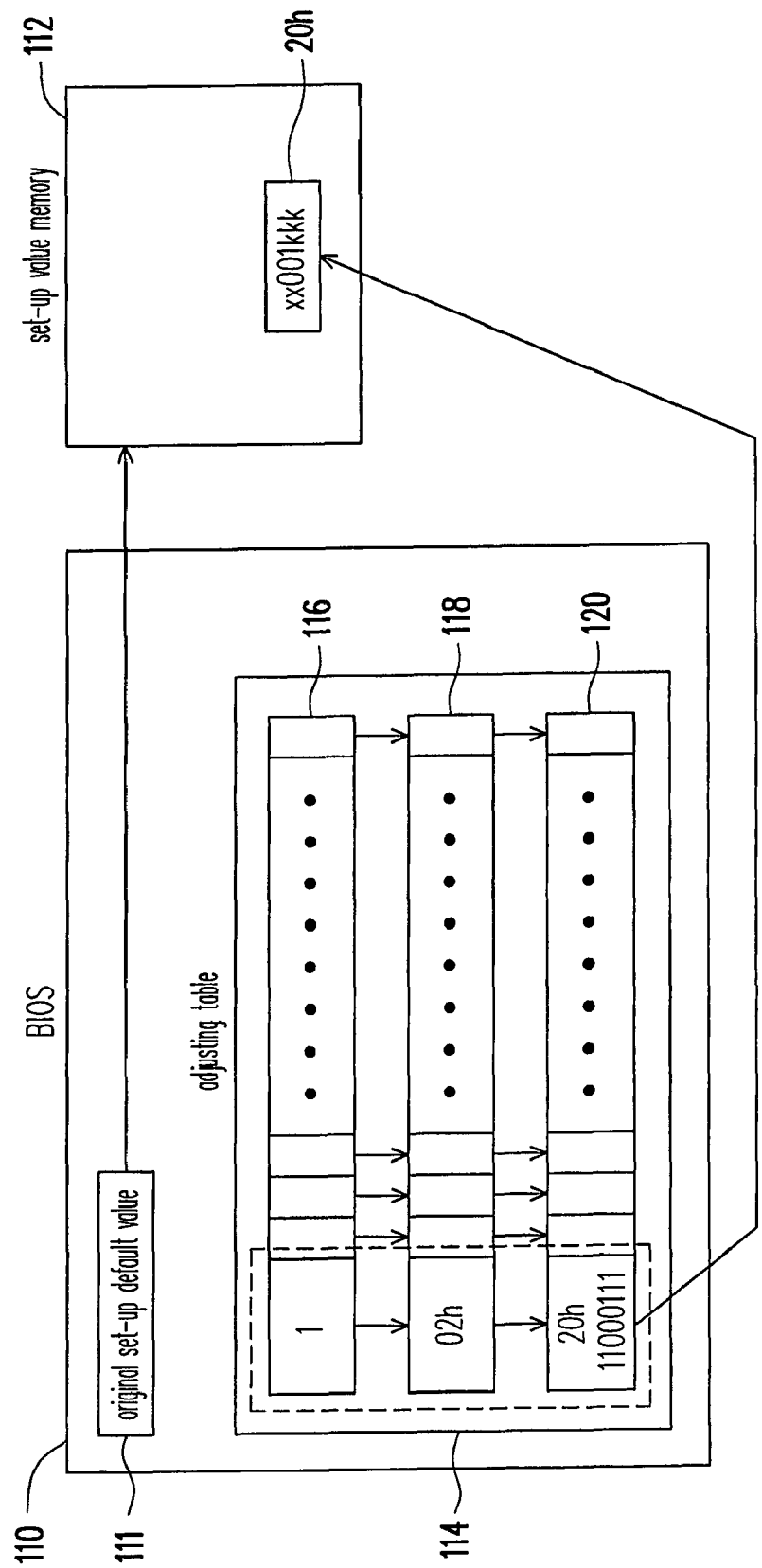
FIG. 1 is a block diagram of a method for adjusting a set-up default value of a BIOS according to an embodiment of the present invention.
Figure 2:
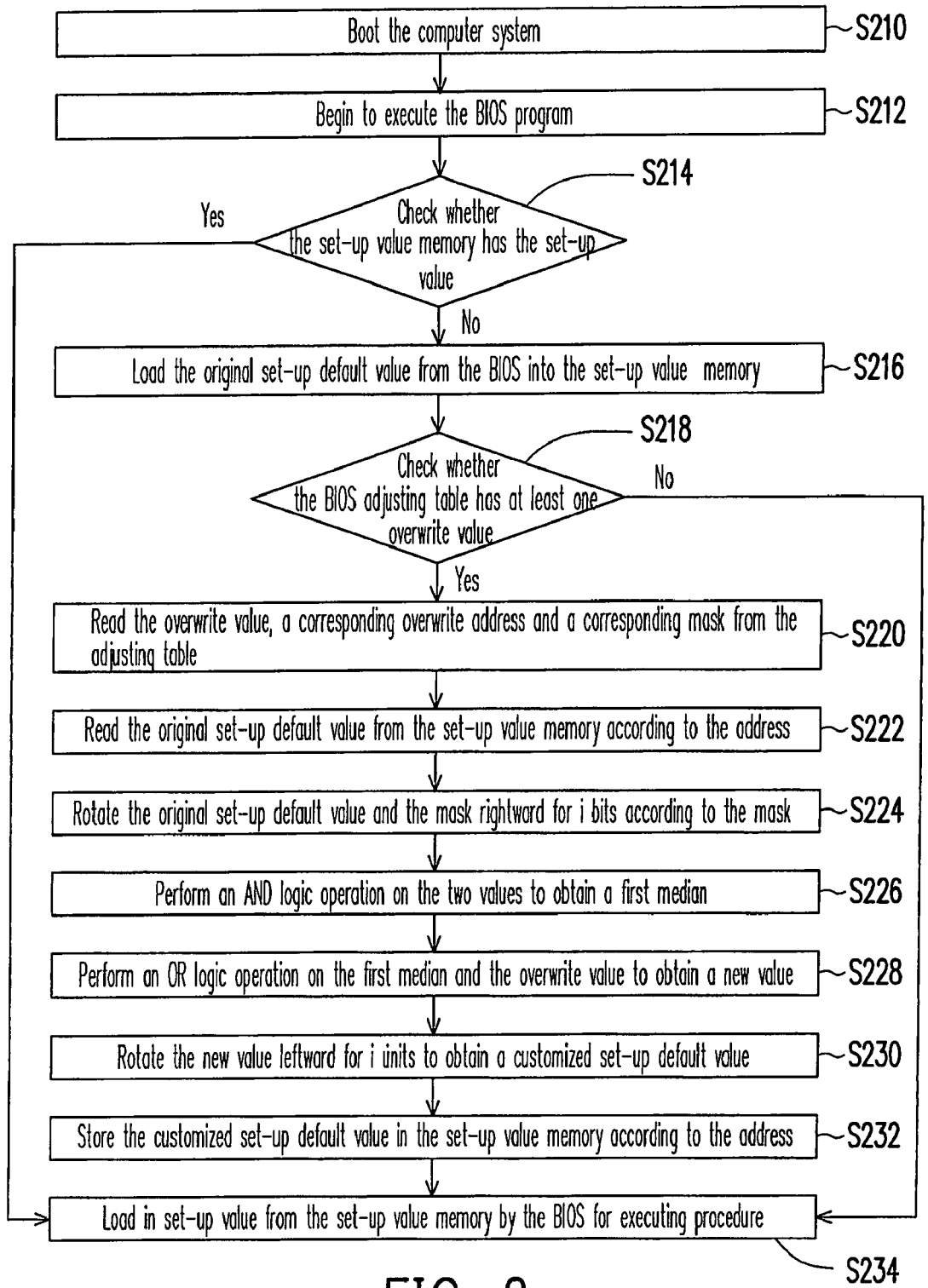
FIG. 2 is a flow chart of the method for adjusting a set-up default value of a BIOS according to an embodiment of the present invention.

FIG. 2 is a flow chart of the method for adjusting the default value of the BIOS according to the embodiment of the present invention, and FIG. 1 is a block diagram of the BIOS program execution and the set-up value memory. In this embodiment, it is assumed that a customer hopes that the computer system is booted from the optical disk drive, but for the original set-up default value of the preset BIOS version, the computer system is booted from the floppy disk drive.

Referring to FIGS. 1 and 2, after the computer system is booted (step S210), the CPU begins to execute the BIOS (step S212). The BIOS can be stored in a BIOS memory 110, in which the BIOS memory 110 is a non-volatile memory (e.g., a read only memory and a FLASH memory etc.). In the process of executing the BIOS, in step S214, firstly it is determined whether or not to load the "set-up default value" into a set-up value memory 112 (e.g., a CMOS memory). In the practical operation, in many cases, it is necessary to load the "set-up default value" into the set-up value memory 112. For example, for the first booting of the computer system, at this time, the set-up value memory 112 does not have any set-up value. Therefore, in the step S214, it is checked whether or not the set-up value memory 112 has the set-up value. In addition, in the step S214, it is also checked whether or not the user gives an instruction to update the content of the set-up value memory 112 to the "set-up default value".

If in the step S214, it is determined not to load the "set-up default value" into the set-up value memory 112, a step S234 is performed. In the step S234, a current set-up value is read from the set-up value memory 112, for continuously executing other procedures of the BIOS.

If in the step S214, it is determined to load the "set-up default value" into the set-up value memory 112, a step S216 is performed. In the step S216, firstly an original set-up default value 111 in the BIOS memory 110 is loaded into the set-up value memory 112. Further, in step S218, it is checked whether or not an adjusting table 114 has an overwrite value. If the adjusting table 114 does not record any overwrite value, it indicates that it is not necessary to modify the "set-up default value" loaded from the original set-up default value 111 into the set-up value memory 112, such that step S234 is performed to read the current set-up value from the set-up value memory 112, for continuously executing other procedures of the BIOS.

In this embodiment, it is assumed that the "set-up default value" required by the customer giving the commission to manufacture the computer system is different from the original set-up default value 111 preset by the computer system manufacturer. For example, the set-up value of the "booting device" in the original set-up default value 111 indicates that the computer system is booted from the floppy disk drive, the "set-up default value" required by the customer is to boot from the optical disk drive. Therefore, the computer system manufacture can record the related adjusting information of the "set-up default value" required by the customer in the adjusting table 114.

In this embodiment, the adjusting table 114 includes a flag field 116, an overwrite value field 118, and an overwrite address field 120. The flag field 116 is used to indicate whether or not to overwrite a part of the content of the original set-up default value. The overwrite value field 118 is used to record the overwrite value. The overwrite address field 120 is used to record the address to be overwritten in the set-up value memory 112. The above assumption is continued, the "booting device" set-up value in the "set-up default value" needs to be adjusted, so the overwrite value and the overwrite address are respectively recorded in the overwrite value field 118 and the overwrite address field 120, and meanwhile the flag field 116 is set. Therefore, in the step S218, the flag field 116 is checked to determine whether or not the adjusting table 114 has the overwrite value.

In this embodiment, the flag field 116 is 1, so the step 220 is performed after finishing the step S218. In the step S220, the overwrite value and the overwrite address are read from the overwrite value field 118 and the overwrite address field 120. Here, it is assumed that the overwrite value read from the overwrite value field 118 is 02h, and the overwrite address read from the overwrite address field 120 is 20h. In this embodiment, only a part of the bits of the address 20h in the set-up value memory 112 needs to be adjusted, so in step S220, a mask "11000111" is further read from the overwrite address field 120. The mask "11000111" indicates that the bits to be adjusted are the $3^{rd}$, $4^{th}$, and $5^{th}$ bits, and the $0^{th}$, $1^{st}$, $2^{nd}$, $6^{th}$, and $7^{th}$ bits will not be changed.

In this embodiment, it is assumed that the address 20h in the set-up value memory 112 is an 8 bit data xxtttkkk (x, t, and k are binary numerical values). The $3^{rd}$, $4^{th}$, and $5^{th}$ bits ttt of the address 20h in the set-up value memory 112 represent "boot device" set-up value, and the $0^{th}$, $1^{st}$, and $2^{nd}$ bits kkk and the $6^{th}$, $7^{th}$ bits xx represent the set-up values of other functions. FIG. 1 shows that the "booting device" set-up value recorded by the set-up value memory 112 is 001b (it is assumed that the "booting device" of the computer system is a floppy disk drive). Further, for example, if the "booting device" set-up values recorded by the set-up value memory 112 are 000b, 010b, 011b, and 100b, it indicates that the "booting devices" of the computer system is, respectively, network device, optical disk drive, hard disk, and USB device.

Next, in step S222, according to the overwrite address (address 20h here) read from the overwrite address field 120, the address 20h set-up value "xx001kkk" is read from the set-up value memory 112. In the step S224, according to the mask read from the overwrite address field 120, the set-up value of the address 20h from the set-up value memory 112 and the mask are rotated rightward for i bits, in which i is an integer greater than or equal to 0. For example, the mask is "11000111", and the set-up value read from the address 20h is "xx001kkk", the mask "11000111" and the set-up value "xx001kkk" are synchronously rotated rightward for 3 bits, so as to make the lowest bit of the mask be 0. After the rightward rotation is finished, the mask becomes "11111000", and the set-up value becomes "kkkxx001".

In a step S226, an AND operation is performed on the rotated set-up value "kkkxx001" and the mask "11111000", so as to obtain a first median "kkkxx000". Next, a step S228 is performed, an OR operation is performed on the first median "kkkxx000" and the overwrite value 02h (i.e., "00000010" in binary form) from the overwrite value field 118, so as to obtain a second median "kkkxx010".

Then, a step S230 is performed, the second median is rotated leftward for i bits, so as to be used as the customized set-up default value. In the above step S224, it rotates rightward for 3 bits, so in the step S230, it must correspondingly rotate leftward for 3 bits. Therefore, the result of rotating the second median "kkkxx010" leftward for 3 bits is "xx010kkk", and "xx010kkk" is used as the customized set-up default value.

Next, a step S232 is performed, according to the address, the customized set-up default value "xx010kkk" is overwritten on the position of the address 20h in the set-up value memory 112. Until now, the adjusting of the first batch of set-up default value in the adjusting table 114 is finished. If the flag field 116 of the adjusting table 114 indicates that other overwrite values exist, the steps S218-S232 are repeated till all the overwrite values of the adjusting table 114 are written in the set-up value memory 112. Finally, a step S234 is performed to read the set-up value finishing the adjustment from the set-up value memory 112, for continuously executing other procedures of the BIOS.

In the above embodiment, after all the original set-up default values 111 in the BIOS memory 110 are loaded into the set-up value memory 112, a part of the set-up value is read from the set-up value memory 112 according to the adjusting table 114, then the read set-up value is adjusted to obtain the customized set-up default value, and finally the customized set-up default value is written back in the set-up value memory 112. However, the people applying the present invention can change the content of the above embodiment according to the requirement. For example, in the process of loading the original set-up default value 111 in the BIOS memory 110 into the set-up value memory 112, the original set-up default value is synchronously adjusted. For example, for FIG. 1, before the BIOS writes a byte "xx001kkk" of the original set-up default value 111 into the address 20h in the set-up value memory 112, the BIOS firstly adjusts the original set-up default value "xx001kkk" to the customized set-up default value "xx010kkk" according to the adjusting table 114, then writes the customized set-up default value "xx010dd" into the address 20h in the set-up value memory 112.

Figure 3:
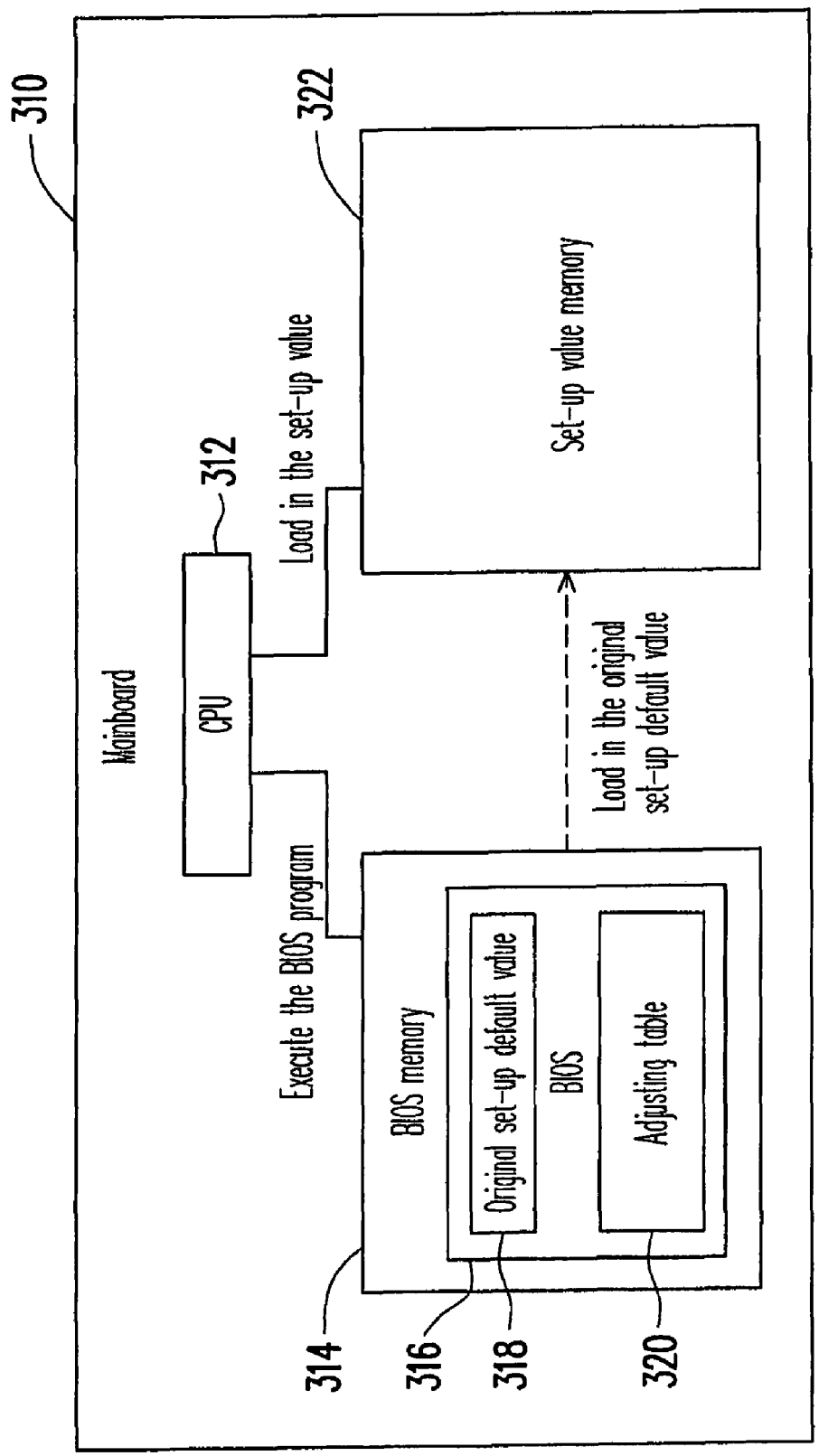
FIG. 3 is an installation diagram of the mainboard according to another embodiment of the present invention.

FIG. 3 is another embodiment of the present invention, and a mainboard device is shown. The mainboard includes a CPU 312, a BIOS memory 314, and a set-up value memory 322. A BIOS 316 is stored in the BIOS memory 314, and an original set-up default value 318 and an adjusting table 320 required for adjusting the default value are built in the BIOS 316. In this embodiment, the BIOS memory 314 is a flash memory, and the set-up value memory is a CMOS memory. The CPU 312 is physically linked with the BIOS memory 314 and the set-up value memory 322, accesses the set-up value in the set-up value memory 322, and executes the BIOS program in the BIOS memory 314, so as to perform various steps of the adjusting method for the set-up default value of the BIOS. Under the initial or certain states, the BIOS memory 314 loads the original set-up default value 318 into the set-up value memory 322 through the CPU 310, such that the BIOS accesses the set-up value by the CPU 312 for executing the BIOS program.

In view of the above, in a method for adjusting the set-up default value of a BIOS according to the present invention, an adjusting table is provided to adjust the original set-up default value, and thus as for the requirements of the customer, it is only necessary to adjust the adjusting table to satisfy the requirements of the customer, such that the additional resource is not required to write a new version of BIOS to support the default value required by the customer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mainboard, comprising:
 a central processing unit (CPU);
 a set-up value memory, coupled to the CPU for storing a group of set-up values; and
 a BIOS memory, coupled to the CPU for storing a BIOS with an adjusting table and an original set-up default value, wherein the CPU executes the BIOS to make the BIOS read the original set-up default value; adjust the original set-up default value according to the adjusting table to obtain a customized set-up default value; and store the customized set-up default value in the set-up value memory as the group of set-up values and the adjusting table comprises:
 a flag field, for indicating whether to overwrite a part of the content of the original set-up default value;
 an overwrite value field, for recording an overwrite value; and
 an overwrite address field, for recording an address to be overwritten in the set-up value memory.

2. The mainboard as claimed in claim 1, wherein the CPU further executes the BIOS to copy the original set-up default value from the BIOS to the set-up value memory, so as to be used as an initial value of the group of set-up values; and to read the original set-up default value from the set-up value memory.

3. The mainboard as claimed in claim 1, wherein the CPU further executes the BIOS to read the original set-up default value from the BIOS.

4. The mainboard as claimed in claim 1, wherein if the adjusting table has at least one overwrite value, the CPU reads the overwrite value, a corresponding address, and a corresponding mask from the adjusting table; the original set-up default value is read from the BIOS or the set-up value memory according to the address; the original set-up default value and the mask are rotated rightward for i bits according to the mask, wherein i is an integer greater than or equal to 0; an AND operation is performed on the rotated original set-up default value and the rotated mask to obtain a first median; an OR operation is performed on the first median and the overwrite value to obtain a second median; and the second median is rotated leftward for i bits, so as to be used as the customized set-up default value.

5. The mainboard as claimed in claim 4, wherein the CPU stores the customized set-up default value to the set-up value memory according to the address.

6. The mainboard as claimed in claim 1, wherein the set-up value memory is a CMOS memory.

7. The mainboard as claimed in claim 1, wherein the BIOS memory is non-volatile memory.

* * * * *